(12) United States Patent
Bries et al.

(10) Patent No.: US 6,572,945 B2
(45) Date of Patent: Jun. 3, 2003

(54) REMOVABLE ADHESIVE TAPE LAMINATE AND SEPARABLE FASTENER

(75) Inventors: James L. Bries, Cottage Grove, MN (US); Michael D. Hamerski, Baldwin Township, WI (US)

(73) Assignee: Minnesota Mining and Manufacturing Company, Saint Paul, MN (US)

( * ) Notice: Subject to any disclaimer, the term of this patent is extended or adjusted under 35 U.S.C. 154(b) by 0 days.

(21) Appl. No.: 09/764,483

(22) Filed: May 7, 2001

(65) Prior Publication Data

US 2002/0009568 A1 Jan. 24, 2002

Related U.S. Application Data

(63) Continuation of application No. 08/989,507, filed on Dec. 12, 1997.

(51) Int. Cl.[7] .................................................. B32B 9/00
(52) U.S. Cl. ..................... 428/40.1; 24/67 AR; 24/306; 428/41.9; 428/99; 428/100
(58) Field of Search ................................ 428/40.1, 41.9, 428/99, 100; 24/67 AR, 306

(56) References Cited

U.S. PATENT DOCUMENTS 5,507,464 A * 4/1996 Hamerski ................... 248/683

* cited by examiner

Primary Examiner—Nasser Ahmad
(74) Attorney, Agent, or Firm—Oblon, Spivak, McClelland, Maier & Neustadt, P.C.

(57) ABSTRACT

An adhesive tape construction is removable from one or more objects to which it is adhered and which is reusably separable within its construction so that an object can be separated from another and subsequently reconnected with one another. The adhesive tape construction can be used to bond the other opposed surfaces of objects, including rigid objects such as a picture frame to a wall, where no portion of the adhesive tape construction projects from between the objects, and which subsequently affords easy separation of the objects without damage to either of them. More specifically, the adhesive tape construction includes a stretch release adhesive tape structure combined with a reusable connector surface.

4 Claims, 6 Drawing Sheets

REMOVABLE ADHESIVE TAPE LAMINATE AND SEPARABLE FASTENER

TECHNICAL FIELD

The present invention relates to adhesive tape structures that can be adhered to a surface and thereafter removed without substantially damaging the surface or leaving substantial adhesive residue. More particularly, the present invention relates to a removable and separable adhesive tape product.

BACKGROUND OF THE INVENTION

Many types of adhesive products have been developed which permit the separable connection of plural objects. For example, laminated tape structures have been used to bond the opposed surfaces of two objects together, such as to bond a wall hanging (e.g. a poster, plaque or picture) to the surface of a wall.

In order to permit a separable connection, the adhesive product may comprise an easily releasable adhesive permitting removal from a substrate surface while leaving little or no adhesive residue on the surface. Examples include repositionable products available under the trade designation "Post-it" from Minnesota Mining and Manufacturing Company ("3M") of St. Paul, Minn.

Another type of removable adhesive tape laminate is a single-sided or double-sided adhesive tape that is stretchable to accomplish removal. Such an adhesive tape can have conventional pressure-sensitive adhesive on one or both major surfaces thereof, and a tape backing comprising a highly extensible material. Alternatively, the adhesive may comprise a solid adhesive material that itself provides one or two adhesive surfaces and is sufficiently extensible. These tapes are often referred to as stretch release adhesive tapes because when the backing or solid adhesive layer is stretched after the tape is adhered on one or both sides, the adhesive stretches and undergoes clean interfacial debonding from the substrate or substrates to which it is adhered. Moreover, such stretch release adhesive tapes are known to be provided in strips for bonding objects together and which have a pull tab portion at the end of the strip to facilitate the stretching and debonding. Examples of such strips and tabs are described in U.S. Pat. No. 5,409,189 to Luhmann and U.S. Pat. No. 5,516,581 to Kreckel et al, and in U.S. patent application Ser. Nos. 08/308,937 entitled "Removable Foam Adhesive Tape" filed Sep. 20, 1994 and 08/940,555 entitled "Removable Adhesive Tape with Controlled Sequential Release" filed Sep. 30, 1997, both to Bries et al. An article support specifically designed for use with such stretch release tapes is disclosed in U.S. Pat. No. 5,507,464 to Hamerski et al. An advantage of these stretch release adhesive tapes is that they utilize conventional pressure sensitive adhesives that can provide a strong bond against shear, peel and lift-off forces. Moreover, heavier weighted objects can be supported.

With these stretch releasable tape strips, access must be provided to the tab to permit the release. In the case where the strip is provided between an object support, e.g. a picture hook, and a surface, e.g. a wall, the tab can be provided easily where the support and exposed tab will be covered by the object (such as a picture) to be supported thereon. Also, with object supports, such as a picture hook, the hook can be reusable by providing a new tape strip. If, however, it is desirable to directly connect an object (such as a picture) to a substrate (such as a wall) by a stretch releasable strip, the tab needs to extend out from between the opposed surfaces to provide access. In many cases, this can provide an objectionable appearance.

To overcome this problem, a tape laminate structure has been developed having an internally separable layer, which is described in co-pending U.S. patent application Ser. No. 08/746,351 entitled "Internally Separable Tape Laminate" filed Nov. 8, 1996. A tape structure is provided that can be used to bond together the opposed surfaces of objects with no portion of the tape structure projecting from between the objects and which permits separation of the objects. The tape structure comprises an internally separable layer provided between one or two stretch releasable tape strips. By this construction, the objects can be first separated from one another by applying a force substantially perpendicular to the surface direction of the tape lamina causing the internally separable layer to break within itself. That is, a portion of the layer stays attached to one object while another portion of the internal layer stays with the other object Then, with the objects separated, each layer portion can be removed from its respective object by pulling a stretch release tab. Since the stretch release tabs are only needed after separation of the internal layer, they can easily be positioned to be hidden when the objects are secured together. However, once the objects are separated from another, which causes the internal layer to be broken apart, the objects cannot be reconnected with one another unless a new separable tape structure (or other type of product) is used.

Reusable connectors of many types are also commonly known, with particular types being more suited for specific different applications than others. Reusable fasteners include mechanical type fasteners, such as hook and loop systems (e.g. hook and loop products available under the trade designation "Velcro" and those commercially available under the trade designation "3M Scotchmate" industrial fastener, from Minnesota Mining and Manufacturing Company ("3M") of St. Paul, Minn.), other mechanical interlocking fasteners, such as described in U.S. Pat. No. 5,077,870 to Melbye et al, and intermeshing fasteners (having connection without macroscopic mechanical deformation or interference), such as described in U.S. Pat. No. 4,875,259 to Appeldorn.

Other reusable fasteners include releasable contact responsive fasteners, such as described in PCT International Publication No. WO 94/21742 or PCT International Publication No. WO 96/24535. Contact responsive fasteners include a non-tacky layer and a target layer to which the non-tacky layer can bond. Contact responsive polymer layers are more readily able to bond to materials having similar solubility parameters, and when the solubility parameters of the target layer and the contact responsive polymer layer are sufficiently close, the degree of interaction between these materials is enhanced and bond formation is promoted.

Many reusable fastener systems are also known to be provided with adhesive on their respective non-connector side surfaces for bonding to the objects which are to be connected. For example, the hook side of a hook and loop system may be adhered to one object while the loop side is adhered to another object. Although these fastener systems permit the separation of one object from another, each of the objects retains its portion of the fastener system, which are not easily removable.

SUMMARY OF THE PRESENT INVENTION

The present invention overcomes the disadvantages and shortcomings of the prior art by providing an adhesive tape construction that is removable from one or more objects to which it is adhered and which is reusably separable within its construction so that an object can be separated from another and subsequently reconnected with one another. Thus, the present invention provides an adhesive tape construction that can be used to bond the other opposed surfaces of objects, including rigid objects such as a picture frame to a wall, where no portion of the adhesive tape construction projects from between the objects, and which subsequently affords easy separation of the objects without damage to either of them. More specifically, the adhesive tape construction includes a stretch release adhesive tape structure combined with a reusable connector surface.

The aforementioned advantages are achieved by an adhesive tape for attaching plural objects to one another, the tape comprising at least one stretchable backing layer having first and second major surfaces and first and second ends, an adhesive surface over at least a portion of the first major surface of the backing layer for bonding to a surface of an object, and a separable connector surface covering at least a portion of the second major surface of the backing layer. The backing layer and adhesive surface may be provided by a single solid adhesive layer or may comprise a separate backing layer combined with an adhesive layer. By this construction, the backing layer and adhesive surface (provided by separate layers or as a solid adhesive layer acting as both) are stretchable together to effect progressive debonding of the adhesive layer from an object after the adhesive surface is bonded to that object by the application of a force to the first end of the backing layer in a direction of extension of the backing layer between its first and second ends. Moreover, the separable connector surface possesses the ability to be connected, disconnected and reconnected to a cooperating connection surface without destruction of the separable connection surface and/or the adhesive tape.

Preferably, a second backing layer is also provided having first and second major surfaces and first and second ends, an adhesive surface over at least a portion of its first major surface for bonding to a surface of another object, and a cooperating separable connector surface covering at least a portion of the second major surface of the second backing layer. The second backing layer and adhesive surface may be provided by a single solid adhesive layer or may comprise a separate backing layer combined with an adhesive layer. Again, the second backing layer and its adhesive surface (provided by separate layers or as a solid adhesive layer acting as both) are stretchable together to effect progressive debonding of the adhesive surface from the other object after its adhesive surface is bonded to that object by the application of a force to the first end of the second backing layer in a direction of extension of the second backing layer between its first and second ends and the cooperating separable connector surface possesses the ability to be connected, disconnected and reconnected to the connection surface of the first backing layer without destruction of the separable connection surface, the cooperating connection surface and the adhesive tape.

The separable connection and cooperating separable connection surfaces can be provided in any number of different ways depending on the particular application and the desirable characteristics for that application. Interlocking mechanical connector systems, intermeshing connector systems, contact responsive fasteners, magnet, and low-tack adhesives are but a few examples of suitable connector systems.

The present invention is also directed to the combination of the aforementioned tape constructions with a plurality of objects. The tape construction is particularly applicable for the joining of an object to a vertical surface (for example, a picture frame to a wall), but can be used in any number of bonding applications.

DETAILED DESCRIPTION OF THE PREFERRED EMBODIMENTS

Figure 1:
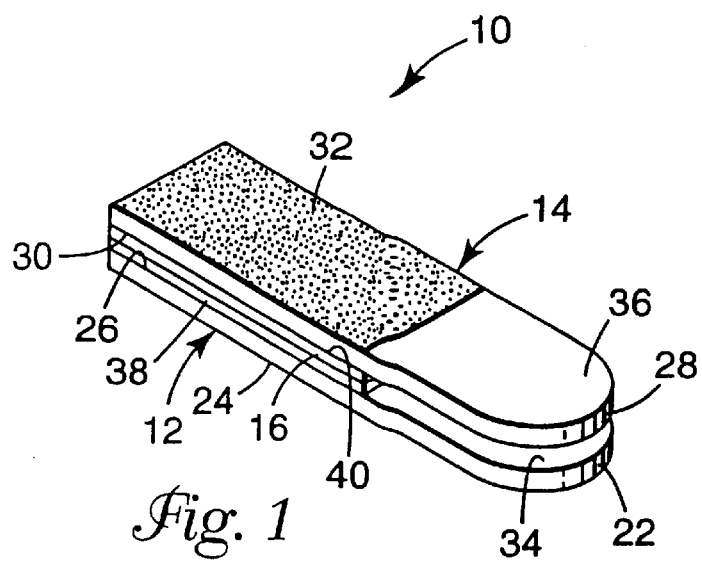
FIG. 1 is a perspective view of a general embodiment in accordance with the present invention of an adhesive tape construction including two stretch release adhesive tape structures combined by a separable connector.
Figure 2:
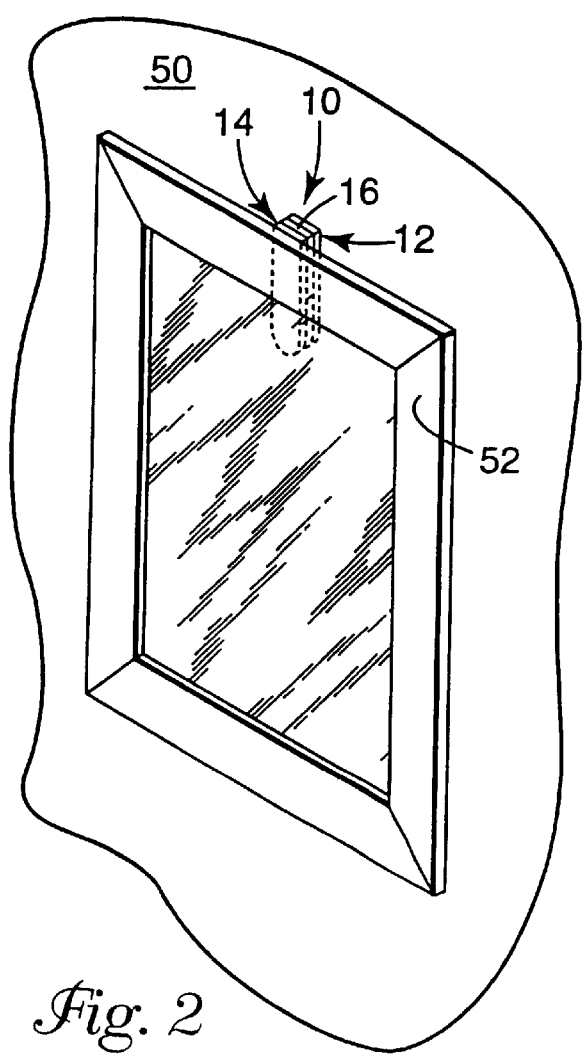
FIG. 2 is perspective view illustrating an object attached to a wall by the adhesive tape construction of FIG. 1.

With reference to the Figures, wherein like numerals are used to designate like components throughout the set of Figures, and initially to FIGS. 1 through 4, an adhesive tape construction 10 is illustrated. The adhesive tape 10 comprises a first stretch release adhesive tape structure 12 and a second stretch release adhesive tape structure 14 connected together by a separable connector system 16. Alternatively, one of the first or second stretch release adhesive tape structures may be replaced with a non-stretch release adhesive, for example, a pressure-sensitive adhesive or an epoxy adhesive, in embodiments where a more permanent adhesion on one side of the tape is desired. As shown in FIG. 2, the adhesive tape 10 can be positioned between a first object 50 (a wall) and a second object 52 (a picture frame) without any portion of the adhesive tape 10 extending out from in between the first and second objects 50 and 52. The picture frame is shown connected by a single adhesive tape 10 positioned to provide a balanced support to the wall; however, any number of adhesive tapes 10 can be used. Moreover, by the present invention, the ability to reposition the objects together is facilitated to allow for accurate alignment and balanced positioning.

Figure 3:
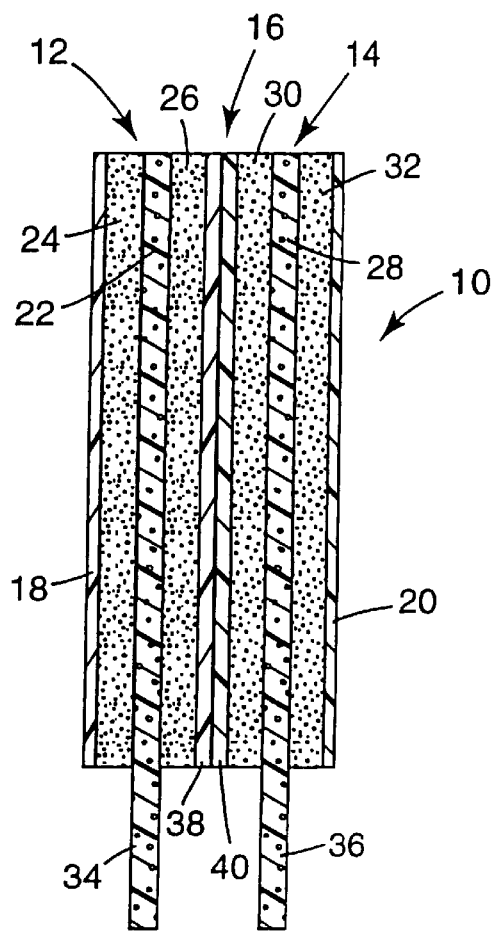
FIG. 3 is an enlarged side view in cross section of the adhesive tape construction of FIG. 1, wherein the stretch release adhesive tape structures are illustrated connected to one another at the separable connector system.

As illustrated best in FIG. 3, the first stretch release adhesive structure 12 is connected with the second stretch release adhesive tape structure 14 by the separable connector system 16 and with a first liner 18 covering one side of the adhesive tape 10 and a second liner 20 covering the other side of the adhesive tape 10. Liners 18 and 20 may comprise any conventional or developed material, such as a silicone release paper, for covering adhesive and which can be easily removed to provide subsequent bonding of adhesive to an object.

The first stretch release adhesive structure 12 comprises a backing layer 22 and adhesive layers 24 and 26 of the same or different pressure-sensitive adhesive compositions on opposite major surfaces of the backing layer 22. The thicknesses of the layers of the Figures are not to scale with respect to one another. Second stretch release adhesive structure 14 likewise comprises a backing layer 28 and adhesive layers 30 and 32 of the same or different pressure-sensitive adhesive compositions on opposite major surfaces of the backing layer 28. The external surfaces of the adhesive layers 24 and 32 of the first and second stretch release adhesive tape structures 12 and 14, respectively, are covered by the liners 18 and 20, respectively.

The backing layers 22 and 28, as illustrated, comprise a stretchable polymeric foam layer. The backing layers 22 and 28 can alternatively comprise a stretchable polymeric film layer. The choice of polymeric foam or polymeric film depends on the specific application for the adhesive tape 10. Polymeric foams can be chosen to optimize conformability and resiliency properties which are helpful when the adhesive tape 10 is to be adhered to surfaces having surface irregularities. Such is the case with a typical wall surface. Polymeric films may be used instead to increase load bearing strength and rupture strength of the tapes; however, tapes are more suitable when the application is to adhere two very smooth surfaces together. Combinations of foams and films are contemplated as well, as is further described below Suitable polymeric foams and films and combinations thereof are discussed in greater detail below.

As an alternative to any of the embodiments disclosed or suggested in this application, solid adhesives can be used instead of the combination of a film and/or foam with adhesive layers. Known stretchable solid adhesives which are generally elastic in nature and usable include rubber-based and acrylate-solid adhesives. When using a solid adhesive as the stretchable backing, it provides not only the backing layer, but also the two adhesive layers as one. Moreover, a solid adhesive layer may itself comprise plural material provided as sublayers or mixtures or otherwise, and may be provided in a way so that one adhesive surface is the same or different than its other adhesive surface. For example, two different solid adhesives can be co-extruded so as to provide a solid adhesive layer comprising two different sublayers, one forming a first adhesive surface of a first adhesive aggressiveness and the other forming a second adhesive surface of a second adhesive aggressiveness. The first may be a strong adhesive, while the second could advantageously be repositionable.

Furthermore, each of the first and second stretch release adhesive tape structures 12 and 14 preferably include a tab 34 and 36, respectively. Tabs 34 and 36 facilitate the stretch release of each adhesive tape structure 12 and 14, respectively. Tab 34 is preferably provided as an extension of the backing layer 12. That is, the backing layer 22 extends farther longitudinally than the adhesive layers 24 or 26. Likewise, the tab 36 comprises an extension of the backing layer 28 that extends farther longitudinally than the adhesive layers 30 and 32. Preferably, the adhesive layers 24, 26, 30 and 32 each cover a similar area of the backing layers 22 and 28, respectively. Tabs 34 and 36 can also be specifically shaped to facilitate the easy gripping thereof for the stretch release, described below. Where a solid adhesive is used, it may further be desirable to make the tab(s) non-adhesive. This can be done by any way of masking the adhesive surface or by rendering the adhesive surface non-adhesive, i.e. detackifying the adhesive surface.

The separable connector system 16 preferably comprises a first connector component 38 and a second connector component 40. As shown in FIG. 3, the first connector component 38 is bonded to the first stretch release adhesive tape structure 12 by the surface of adhesive layer 26. Likewise, the second connector component 40 is bonded to the second stretch release adhesive tape structure 14 by the surface of adhesive layer 30. Again, the first and second connector components 38 and 40 are preferably co-extensive with and cover the similar areas as the adhesive layers 24, 26, 30 and 32.

Figure 4:
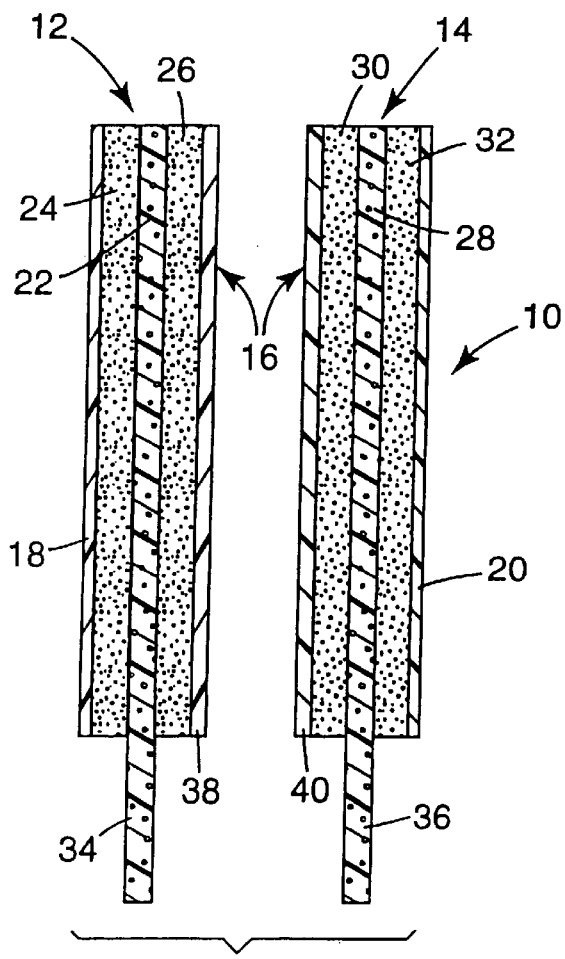
FIG. 4 is an enlarged side view in cross section of the adhesive tape construction of FIG. 1, wherein the stretch release adhesive tape structures are illustrated separated from one another at the separable connector system.

The separable connector system 16 can comprise any known or developed reusable connector system for connecting the first and second stretch release adhesive tape structures 12 and 14 together. It is understood that connector systems may have many different properties that make them particularly suitable for certain applications or for connecting certain types of objects together. Thus, in accordance with the present invention, any such connector system can be used, but the chosen connector system can be advantageously picked based upon its properties that make it particularly suitable for a specific application or for connecting certain types of objects together. Preferably, the separable connector system 16 permits the reusable separation and connection of the stretch release adhesive tape structures 12 and 14 along a general plane. The connector system 16 may comprise, for example, mechanical type fasteners, including interlocking systems, intermeshing systems (having connection without macroscopic mechanical deformation or interference), releasable contact responsive fasteners, and the like, a number of examples of which will be specifically described below. As shown in FIG. 4, the stretch release adhesive tape structures 12 and 14 are separable so that the first connector component 38 remains with the first stretch release adhesive tape structure 12 and the second connector component 40 remains with the second stretch release adhesive tape structure 14 after separation of the connector system 16.

The area of connection and the type of the separable connector system 16 should be selected so that the force required to separate the adhesive tape 10 into the first and second stretch release adhesive tape structures 12 and 14 can be readily applied by a user. Such a force may be applied in a direction substantially perpendicular to the general plane of the connector system, or as a peeling force, a cleavage force, combinations thereof or other release mechanisms The type of force applied depends largely on the objects that are bonded together. With very flexible materials, a peeling force would likely be a primary force utilized for releasing the separable connector system 16. With rigid materials, such as shown in FIG. 2, a cleavage force may be mostly applied; that is where a person would pull from the bottom edge of the frame (causing angular displacement) to release the separable connector system 16 of the adhesive tape 10 located at the top. If the frame were pulled to release in a perpendicular direction, a perpendicular force is applied. Moreover, the connector system 16 should provide sufficient strength along the general plane of its separation so that, depending on the specific application, the separable connector system 16 will not separate based on the use of the adhesive tape 10 between plural objects. In the case of an object such as a picture frame mounted to a vertical wall surface (as shown in FIG. 2), the connector system 16 should be of sufficient strength in the direction of its general plane of separation so that the picture frame will not shift downward during application or over time. The separable connector system 16 provides an internal static shear strength in a direction parallel to the surfaces of the adhesive layers 24 and 32 for supporting the objects between which the adhesive tape 10 is attached in that direction. That is, the shear strength of the connector system 16 preferably equals or exceeds the highest shear force that the pressure sensitive adhesive can develop with surfaces to which it is applied (e.g., about six pounds per square inch (0.041 MPa)).

From experimentation when utilizing a primarily perpendicular separation force (that is without significant other force components, which can change these results dramatically), it has been determined that when the adhesive tape 10 is used to attach an object to the surface of wallpaper or unpainted drywall, the dynamic tensile force in a direction perpendicular to the surfaces of the adhesive layers 24 and 32 and the general plane of separation of the connector system 16 should be no more than about 8 to 10 pounds per square inch (0.055 to 0.069 MPa) to preclude the possibility of damage to such surfaces. In contrast, when the adhesive tape 10 is used to attach an object to some painted surfaces, e.g., the surface of a painted cement block wall, or a metal cabinet with baked on paint, or to the surface of glass or ceramic material, the dynamic tensile force required to separate the separable connector system 16 can be up to 30, 35 or even 40 pounds per square inch (0.21, 0.24, or 0.276 MPa) without causing damage to such surfaces. When the adhesive tape 10 is used to attach an object to the surface of yet other types of materials (e.g., wood or veneer) the dynamic tensile force in the perpendicular direction required to separate the connector system 16 should be in the range of about 20 to 30 pounds per square inch (0.14 to 0.21 MPa) to restrict damages to those surfaces.

When other release mechanisms and forces (e.g. peel or cleavage) are applied, the same concerns are preferably addressed. That is, it is desirable to provide a requisite separation force without causing damage to one or both of the adhered surfaces. For example, where a peel force, cleave force or combination of forces (including combinations with a perpendicular lift force) is/are to be applied for removal, the separable connector system 16 may be separated by the application of lower force values.

In any case, different embodiments of the adhesive tape 10 can be made with separable connector systems 16 of different types, areas of connection, or materials that require different dynamic tensile forces to separate the connector system 16 as may be appropriate for use of the adhesive tape 10 on different substrates (based on the surface composition or its finish, or the nature of the substrate, e.g. its flexibility). These different embodiments of the adhesive tape 10 can be coded by making them in different shapes and/or colors to indicate the substrates on which their use is most appropriate.

The aggressiveness of these adhesive layers 24, 26, 30 and 32 should be chosen so that the separable connector system 16 comprising first component 38 and second component 40 separates prior to any delamination of the first or second stretch release adhesive tape structures 12 or 14 or to separation of the bond between the adhesive layers 24 and 32 with the surfaces of objects 50 and 52, respectively. As is well known, the adhesive affinity or aggressiveness can be modified by treatments of the backing materials or surface objects. Treatments include without limitation, for example, corona discharge, plasma discharge, flame treatment, electron beam irradiation, ultraviolet radiation, chemical priming, or acid etching.

Figure 5:
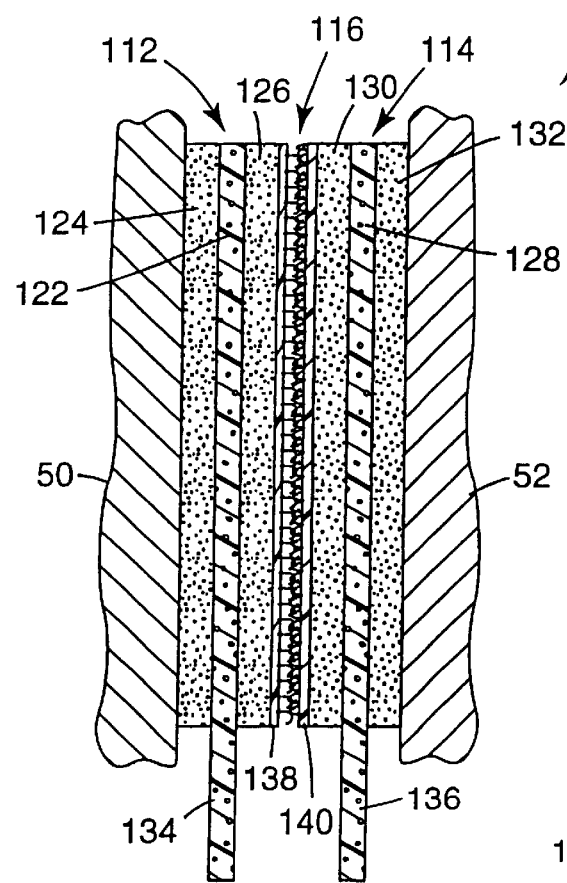
FIG. 5 is an enlarged side view in cross section of a specific embodiment in accordance with the present invention having a hook and loop separable connector system and with the adhesive tape construction bonded between first and second objects.

Illustrated in FIG. 5 is a specific example of an adhesive tape construction 110 connected between a first object 50 and a second object 52. The first object 50 may be a wall, for example, to which a picture frame, for example, is attached. The adhesive tape 110 comprises a first stretch release adhesive tape structure 112 and a second stretch release adhesive tape structure 114. A separable connector system 116 connects the stretch release adhesive tape structures 112 and 114 together as shown in FIG. 5. The first stretch release adhesive tape structure 112 comprises a backing layer 122, a first adhesive layer 124 and a second adhesive layer 126. The second stretch release adhesive tape structure 114 comprises backing layer 128, a first adhesive layer 130 and a second adhesive layer 132. Tabs 134 and 136 are provided as extensions of the backing layers 122 and 128, respectively, to facilitate stretch removable objects 50 and 52, in the manner described below.

In the specific example, a first connector component comprises a layer of hook material 138 which is bonded with the first stretch release adhesive tape structure 112 at the surface of the adhesive layer 126. A second connector component of the separable connector system 116 comprises a layer of loop material 140 which is bonded with the second stretch release adhesive tape structure 114 at the surface of adhesive layer 130. As shown in FIG. 5, the hook and loop material are interentangled thereby connecting the separable connector system 116, as conventionally known. Moreover, it is contemplated that any commercially available hook and loop connector system can be utilized within this embodiment, so long as the ease of separation can be accomplished in accordance with a desired force as based on a preferred application and as discussed above. The adhesive layers 124, 126, 130 and 132 preferably comprise conventional pressure-sensitive adhesive of the same or different types. However, the aggressiveness of these adhesive layers should be chosen so that the separable connector system 116 comprising hook material 138 and loop material 140 separates prior to any delamination of the first or second stretch release adhesive tape structures 112 or 114 or to separation of the bond between the adhesive layers 124 and 132 with the surfaces of objects 50 and 52, respectively.

Hook and loop connector systems are but one type of mechanical interlocking connector systems which are suggested by this embodiment. By mechanical interlocking, it is meant those fasteners where at least one of the connector elements undergoes some macroscopic deformation (preferably plastic deformation) so that a mechanical interference results between plural components. Well known examples include hook and loop products commercially available under the trade designation "3M Scotchmate" industrial fastener, from Minnesota Mining and Manufacturing Company ("3M") of St. Paul, Minn.) and those hook and loop products that are commercially available under the trade designation "Velcro". Many other connector systems and fasteners are know which comprise elements extending from a generally planar layer of one material to meet with similar or dissimilar cooperating members extending from another generally planar layer. Many different modifications of the interengaging elements are designed based on the requisite force and manner of separation between the cooperating layers of such a separable connector system.

Figure 6:
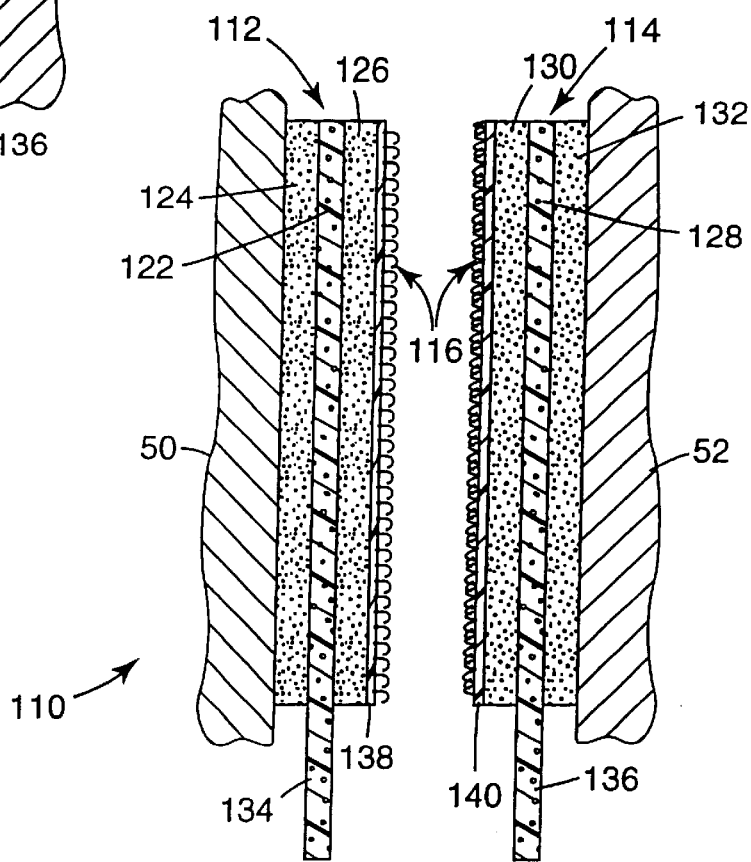
FIG. 6 is an enlarged side view in cross section of the adhesive tape construction of FIG. 5 still adhered to the first and second objects but separated from one another and on the hook and loop connector system.

As illustrated in FIG. 6, the first stretch release adhesive tape structure 112 is separable from the second stretch release adhesive tape structure 114 by way of the separable connector system 116 without changing substantially the layers making up the first and second stretch release adhesive tape structures 112 and 114. A significant advantage of the tape constructions in accordance with the present invention is that because the first and second stretch release adhesive tape structures are separable from one another, no portion or tab or one or both of the stretch release adhesive tape structures need to extend beyond an edge of either object 50 or 52, as illustrated in FIG. 2. In other words, because the stretch release adhesive tape structures 112 and 114, for example, are separable from one another, stretch release of one or both thereof can be accomplished after the separation step which provides access to the tabs 134 and 136.

Additional advantages are based upon the incorporation of a separable connector system 116 between the first and second stretch release adhesive tape structures 112 and 114 because the objects 50 and 52 can be separated from one another without destruction of either stretch release adhesive tape structure 112 or 114. Moreover, that means that the objects 50 and 52 can also be reconnected together by way of the same stretch release adhesive tape structures 112 and 114. Further in this regard, an advantage of a mechanical interlocking type connector system such as hook and loop material is that not only can the objects 50 and 52 be reconnected, they can be positionally adjusted with respect to one another. For example, if object 52 comprises a picture frame mounted to a wall 50, the vertical, horizontal or angular position of the picture frame 52 can be adjusted relative to the wall 50. Also, one of the first and second stretch release adhesive tape structures can be designed to present an enlarged connector surface as compared to that of the other to permit greater flexibility of connection and positioning of the objects relative to one another. They can be moved around within the limits presented by the larger pad. The same can be accomplished by enlarging both pads; however, concern should be given to the force that may be required to separate the separable connector system 116 if both pads are maximally connected.

Figures 7, 8:
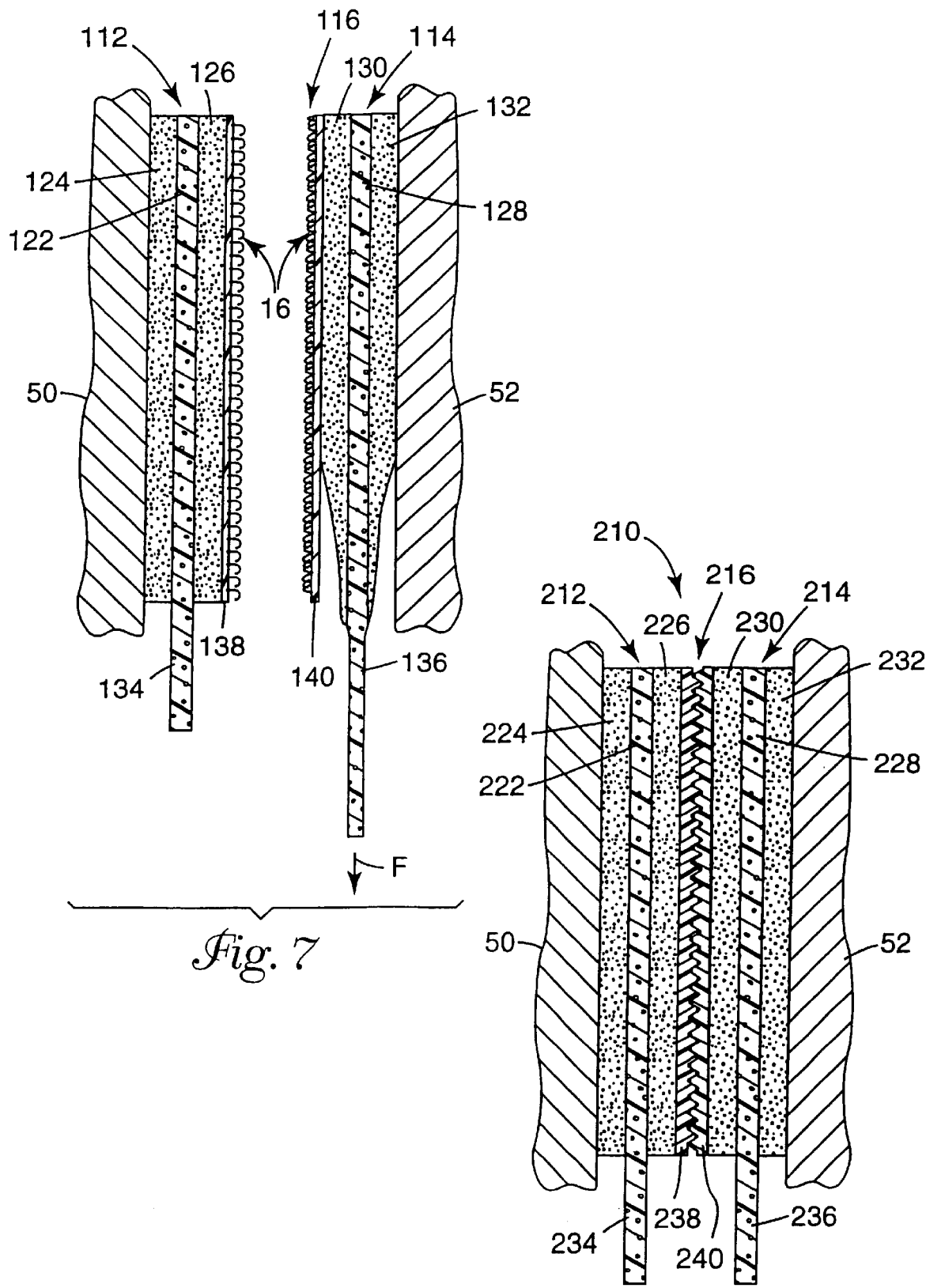
FIG. 7 is an enlarged side view in cross section of the adhesive tape construction of FIGS. 5 and 6 showing the tape construction separated along the hook and loop connector system and with one of the stretch release adhesive tape structures partially in a debonded state from one of the objects.
FIG. 8 is an enlarged side view in cross section of another adhesive tape construction in accordance with the present invention including two stretch release adhesive tape structures connected together by an intermeshing structure connector system and with the adhesive tape construction adhered between first and second objects.

Removal of one or both of the stretch release adhesive tape structures 112 and 114 can be accomplished as illustrated in FIG. 7, wherein the second stretch release adhesive tape structure 114 is illustrated in a partially debonded state. Specifically, a progressive stretch release and removal of the object 52 from the stretch release adhesive tape structure 114 is accomplished by the application of a force F applied as illustrated in FIG. 7 to the tab 136. Force F causes the stretching of tab 136 and progressively the stretching of the backing layer 128. Likewise, a progressive debonding of the adhesive layers 130 and 132 occurs from the surface of the loop material 140 and the surface of the object 52, respectively. FIG. 7 illustrates the progressive debonding at an intermediate point of the process. Continued application of force F will cause entire debonding of the second stretch release adhesive tape structure 114. Likewise, the first stretch release adhesive tape structure 112 can be removed from the surface of object 50. That is, by application of a force to the tab 134, the stretch release adhesive tape structure 112 is removed from the surface of object 50. Thereafter, the surfaces of the objects 50 and 52 are substantially clean of adhesive and the hook and loop layers 138 and 140 could be reused.

Another specific embodiment of an adhesive tape construction 210 is illustrated in FIG. 8. Again, the tape structure 210, like tape structure 110, comprises first and second stretch release adhesive tape structures 212 and 214. Stretch release adhesive tape structure 212 comprises a backing layer 222, first adhesive layer 224, and second adhesive layer 226. The second stretch release adhesive tape structure 214 comprises backing layer 228, first adhesive layer 230 and second adhesive layer 232. Tabs 234 and 236 facilitate removal thereof from the respective surfaces of the objects 50 and 52.

The first and second stretch release adhesive tape structures 212 and 214 are separably connected with one another by way of a separable connector system 216, which comprises similar intermeshing first and second connector components 238 and 240. The first and second connector components 238 and 240, as illustrated, each comprise a replicated (preferably micro-replicated) surface structure. The surface structure of the first connector component 238 is preferably similar, but need not be, to the surface structure of the second connector component 240. This type of separable connector system relies on the frictional characteristics of the materials and structures making up the first and second connector components 238 and 240 without macroscopic deformation and interference between the elements. Examples of this type of intermeshable connector (including similar and dissimilar mating structures) are described in U.S. Pat. No. 4,875,259 to Appeldorn, U.S. Pat. No. 5,360,270 to Appeldorn, and U.S. Pat. No. 5,201,101 to Rouser et al, the entire disclosures of which are incorporated herein by reference.

The ability to separate the first and second stretch release adhesive tape structures 212 and 214, and thus the objects 50 and 52, from each other is accomplished in the same way as the above-described embodiment and preferably takes into concern the same considerations. That is, the intermeshable connector system 216 should permit easy separation of the objects 50 and 52 depending on the surfaces of the objects while providing sufficient shear strength and without causing delamination of either of the stretch release adhesive tape structures 212 or 214 themselves or from the surfaces of the objects 50 and 52. After separation, the stretch release adhesive tape structures 212 and 214 can advantageously be reconnected to reposition the objects together in a same or different position, and if desired, the first and/or second stretch release adhesive tape structures 212 and 214 can be removed from the objects 50 and 52, respectively. Also, one of the first and second stretch release adhesive tape structures can be designed to present an enlarged connector surface as compared to that of the other to permit greater flexibility of connection and positioning of the objects relative to one another. They can be moved around within the limits presented by the larger pad. The same can be accomplished by enlarging both pads; however, concern should be given to the force that may be required to separate the separable connector system 216 if both pads are maximally connected. Removal of one or both stretch release adhesive tape structures 212 and 214 is accomplished in the same way as described above and illustrated in FIG. 7 wherein a progressive stretching of the backing layers 222 and 228 causes debonding of the adhesive layers from the connector system components 238 and 240 as well as the surfaces of the objects 50 and 52.

Other mechanical connectors can also be used as the separable connector system 16 as long as the system is separable and preferably reusable. Other examples include without limitation snaps (plastic or metal), deformable closure systems, such as those commercially available under the trade designation "Ziplok" closures, deformable connectors having pins and sockets, and the like. Other closure devices using other mechanisms, such a the creation of suction by a suction cup, electrostatic charge, etc. can be utilized.

With reference back to FIGS. 1 through 4, other separable connector systems 16 are specifically contemplated. As a further example, the connector system 16 can comprise a non-tacky adhesive system including a contact responsive fastener layer, such as are disclosed and described in the published PCT application No. WO 96/24535 and the published PCT Application No. WO 94/21742, the entire disclosures of which are incorporated herein by reference. A contact responsive fastening layer is a non-tacky layer that has essentially no tack to paper, and allows multiple fastening and releasing cycles of the fastening layer with a target surface. The target surface preferably has a solubility parameter which permits the contact responsive fastening layer to have a selectable and consistently repeatable low 90° peel strength and high shear strength. Preferably, the contact responsive fastener layer can be reused against the target surface many times without noticeable transfer or migration of either material to the other. An advantageous feature of the contact responsive fastener layer is that it is cleanable, for example, with isopropanol or soap and water, in order to maintain/restore its fastening characteristics.

Numerous polymeric materials may be used as the contact responsive layer. The polymeric material may be a homopolymer, a random copolymer, a block copolymer, a graft copolymer. It may be crosslinked or uncrosslinked. Specific examples of polymers useful as the contact responsive fastening layer include ethylene-containing copolymers, urethane polymers such as urethanes prepared by the reaction of an isocyanate and an isocyanate-reactive compound, acrylic and acrylate polymers, urethane-acrylate polymers, butyl rubber, butadiene-acrylonitrile polymers and butadiene-acrylonitrile-isoprene polymers. Blends and mixtures of polymeric materials may be used if desired. A preferred polymer for the contact responsive fastener layer is a butadiene-acrylonitrile-isoprene polymer as described in published PCT Application No. WO 94/21742, which has been incorporated herein by reference.

The first connector component 38 may comprise such a contact responsive fastener material. The second connector component 40 may comprise a material which provides a target surface to which the contact's responsive fastener material can releasably and reusably connect. Target surfaces are provided as a surface of a layer comprising the second connector component 40 in the illustrated embodiment. As shown, adhesive layers 26 and 30 bond the contact responsive fastener layer (first connector component 38) and the target surface material layer (second connector component 40) to the first and second stretch release adhesive tape structure 12 and 14.

Target surfaces useful in the present invention may be selected from a wide variety of materials. Useful target surfaces are materials that do not bond permanently to the contact responsive fastening layer. Examples of useful target surfaces include those materials previously identified as being useful for the fastening layer, polycarbonate, polyacrylonitrile, butadiene-styrene polymers, poly (methylmethacrylate), polyamide, ethylene vinylacetate copolymer, treated and untreated poly(ethylene terephthalate), material available under the trade designation "Surlyn," polystyrene, polyolefins, such as polyethylene, including high density polyethylene, low density polyethylene, linear low density polyethylene, and linear ultra low density polyethylene, polypropylene, and polybutylenes; vinyl copolymers, and polyvinyl acetates, olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations of the foregoing. Useful target surfaces also include metallic surfaces such as stainless steel; glass; paper; enamel coated substrates; etc. The choice of the target surface to be used is dependent upon the needs of the application, provided however, that the target surface and contact responsive fastener layer do no block.

Alternatively, the target surface can be provided as one of the major surfaces of one of the layers of either the first and second stretch release adhesive tape structures 12 and 14, such as a surface of the backing layer 28, for example. Then, the first connector component 38 comprising the contact responsive fastener material, can be repositionably connected with the target surface of the backing layer 28. Again, separation between first and second stretch release adhesive tape structures 12 and 14 is provided. Then, the stretching of each backing layer 22 and 28 can remove the first and second stretch release adhesive tape structures 12 and 14 from the objects to which they are applied.

Figure 12:
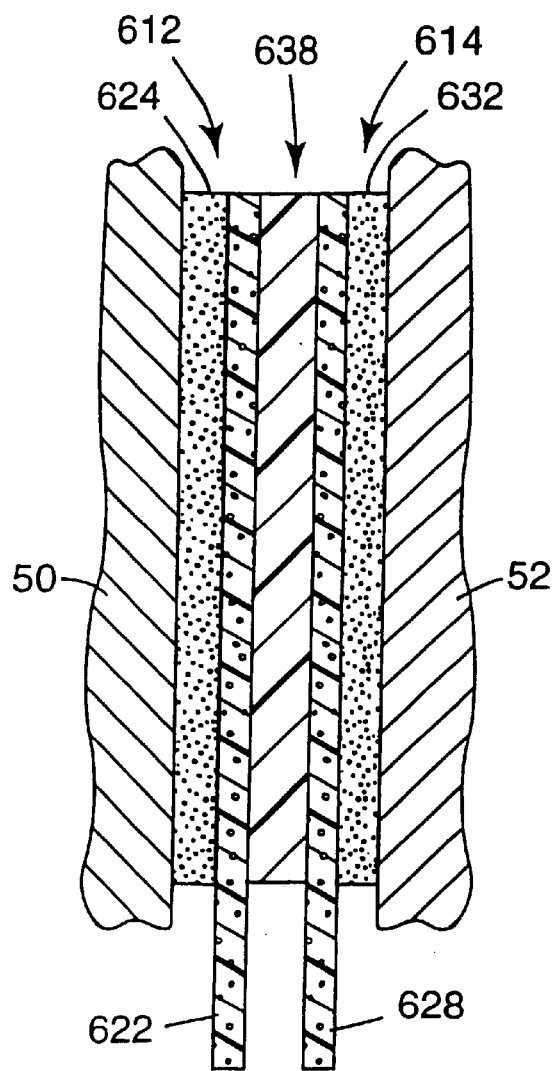
FIG. 12 is an enlarged side view in cross section of yet another adhesive tape construction in accordance with the present invention including two stretch release adhesive tape structures, each of the adhesive tape structures sharing a layer of non-tacky adhesive that also provides a separable connector system, and with the adhesive tape construction adhered between first and second objects.

As shown in FIG. 12, an adhesive tape 610 can comprise first and second stretch release adhesive tape structures 612 and 614, wherein each of the first and second stretch release adhesive tape structures 612 and 614 comprises a backing layer 622 and 628, respectively, and an adhesive layer 624 and 632, respectively, for bonding between objects 50 and 52. A single layer of contact responsive fastener material 638 is bonded between the first and second stretch release adhesive tape structures 612 and 614 to provide the connector system 616. In this case the surfaces of backing layers 622 and 628 provide target surfaces to which the contact responsive fastener layer 638 is bonded. The surfaces may comprise the same material or different material. If different materials are provided, then the relative adhesion of the bonds between the contact responsive fastener layer 638 and target surfaces of backing layers 622 and 628 can be varied. Thus, one of the bonds can be the primary releasable and reusable bond to act as the separable connector system in accordance with the present invention. The other bond can be releasable or permanent. Moreover, if same materials are used to provide the target surfaces, one or both may be treated to alter its adhesion or bonding to the contact responsive fastener layer 638. For example, one target surface may be treated by corona discharge. Stretch release of the first and second stretch release adhesive tape structures 612 and 614 from objects 50 and 52 would be done the same way as described above. Separation prior to stretch release is facilitated by the repositionable connection between the contact responsive fastener layer and at least one of the target surfaces.

Yet another contemplated embodiment comprises the provision of magnetic material as the first and second connector components 38 and 40. Preferable magnetic materials are those flexible magnetic material strips, which are conventionally known. However, rigid magnetic material can also be used in accordance with the present invention, depending on the particular application.

In particular, the first connector component 38 may comprise a layer of such magnetic strip material and the second connector component 40 may comprise a similar magnetic material strip which are arranged relative to one another to create an attractive force. As a further alternative to this specific embodiment, one of the connector component layers 38 or 40 may comprise instead a magnetically attractive material such as a thin sheet of iron or steel or a metal vapor-coated polymeric film. In the same manner as two magnetic strips, a layer of magnetically attractive material will be attracted to one magnetic strip. An additional advantage of the cooperating magnetic strips or a magnetic strip with magnetically attractive material is that the objects which are connected together by such a tape construction can be relatively repositioned even without separating the first and second stretch release adhesive tape structures 12 and 14 from one another. The combination of magnetic strips or magnetic strip and magnetically attractive material will permit relative sliding while maintaining contact with one another. This is particularly useful for adjusting or aligning the objects to one another. This ability can be enhanced by providing a larger pad of at least the first or second connector components 38 or 40 relative to the other.

As yet another contemplated embodiment, at least one of the first and second connector components 38 and 40 may comprise a low adhesion material which permits separation and repositioning. The other of the first and second connector components 38 and 40 may comprise a material which is easily separable from and reconnectable to such a low adhesion material. Alternatively, both components 38 and 40 may comprise a same or different low adhesion material if they can be adequately separated from one another. Also, the low adhesion material may be provided as the second adhesive layer 26, for example, without the provision of any specific connector component 38. One of the major surfaces of the backing layer 28 can provide the target surface for the low adhesion material instead of a surface of a second connector component 40, although the adhesive layer 30 may be included so long as it permits separation with the low adhesion material. One type of low adhesion material suitable for this technique is the low-tack adhesive used in making repositionable notes which are commercially available under the trade designation "Post-it" from Minnesota Mining and Manufacturing of St. Paul, Minn. As with any of the above embodiments, one of the first and second stretch release adhesive tape structures can be designed to present an enlarged connector surface as compared to that of the other to permit greater flexibility of connection and positioning of the objects relative to one another. The components 38 and 40 may also be replaced with a single layer of material that permits separation from one or both adhesive layers 26 and 30. For example, well known silicone release papers, which are commonly used as adhesive tape liners, can be used in making such a single layer that could be provided between two adhesive layers. Also, a film can be coated with a low adhesion backing material, as are also well-known (and have been developed to permit the adhesive of a tape to release from the tape backing when in roll form). One or both sides of the single layer may be treated. If only one side of such a single layer is treated to be releasable, then only one adhesive layer 26 or 30 would be separable, which functions in accordance with the present invention. If both sides of such a single layer are releasably treated, then both sides can release, although one bond may be more aggressive than the other depending on the adhesives (which may be different), the release treatment to the single layer, or surface treatments (to either the adhesive or the single layer material).

It is also contemplated that features of the various types of connectors can be combined with one another to provide a separable connector. For example, a magnetic surface or contact responsive fastener surface could also be structured in the manner of an intermeshing connector or may include a low adhesion material layer.

Figure 9:
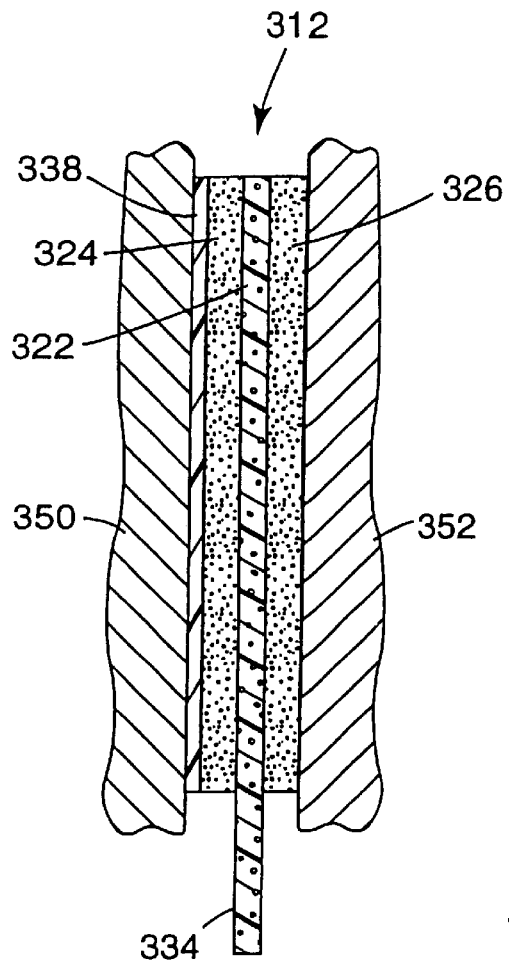
FIG. 9 is an enlarged side view in cross section of yet another adhesive tape construction in accordance with the present invention including a stretch release adhesive tape structure combined with a separable connector surface wherein the separable connector surface is reusably connected to a first object while the stretch release adhesive tape structure is connected to a second object.
Figure 10:
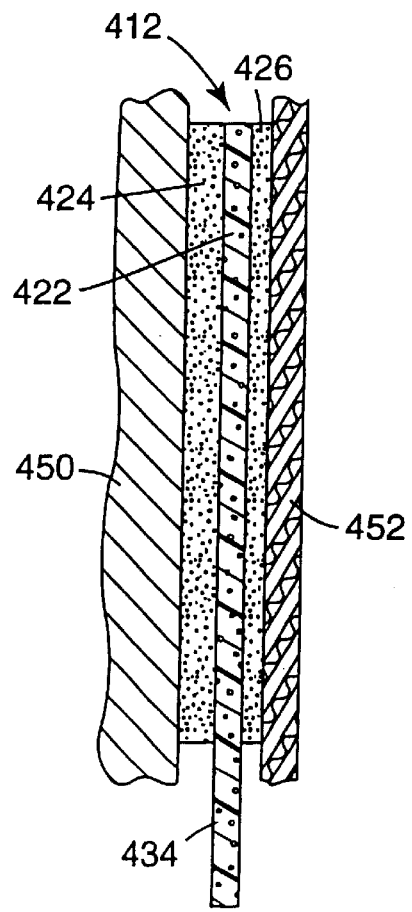
FIG. 10 is an enlarged view in cross section of yet another embodiment of an adhesive tape construction in accordance with the present invention having a stretch release adhesive tape structure wherein an adhesive surface of the stretch release adhesive tape structure provides a reusable separable connector surface adhered to an object while the adhesive of the stretch release adhesive structure is adhered to another object.

Illustrated in FIGS. 9 and 10 are further embodiments in accordance with the present invention where but a single connector surface is adequate for connection to a particular object surface. In these cases, only a single stretch release adhesive tape structure is thus required. Illustrated in FIG. 9 is a stretch release adhesive tape structure 312 comprising a backing layer 322, a first adhesive layer 324 and a second adhesive layer 326. A tab 334 facilitates removal of the stretch release adhesive tape structure 312. The stretch release adhesive tape structure 312 is shown connected between a first object 350 and a second object 352. Instead of the provision of a separable connector system that comprises plural components, a single connector component 338 is connected to the stretch release adhesive tape structure 312 at its first adhesive layer 324, as illustrated. The second adhesive layer 326 is shown bonded to the surface of object 352.

In this case, the surface of the connector component 338 would have a particular affinity or capability to connect with a surface of object 350. For example, if the object 350 comprises a magnetically attractive metal material, the connector component 338 may comprise a magnetic strip such as a flexible magnetic strip, as discussed above. This would permit the objects 350 and 352 to be separated from one another and then allow the stretch release adhesive tape strip 12 to be removed from the surface of the object 352 without having to extend the tab 334 out from between the objects 350 and 352. That is, this single stretch release structure adhesive tape version includes the same advantages as the double stretch release adhesive tape structures discussed above. Once the objects 350 and 352 are separated, access to the stretch release tab 334 is provided. Another specific example could be where the connector component 338 comprises a material such as a hook material (discussed above) and wherein the object 350 includes a surface that inherently provides a loop type structure, such as a loose fabric material. If the object 350 provides a surface that is suitable as a target layer for a contact responsive fastener, as discussed above, the connector component 338 may simply comprise a contact responsive fastener material. In other words, the object 350 may be a type of object which is by its own construction is provided with a surface that can act as one of the parts of a connector system, whereby it already possesses a specific capability to cooperate with the material or structure of a connector component 338.

FIG. 10 shows a structure similar to FIG. 9 including a stretch release adhesive tape structure 412 connecting a first object 450 with a second object 452 in a separable and removable manner. There is, however, no provision of a separate connector component as in FIG. 9. Instead, the stretch release adhesive tape structure 412 comprises a backing layer 422, a first adhesive layer 424 and a second adhesive 426 that comprises a low adhesion material provided directly onto a major surface of the backing layer 422. A suitable low-tack adhesive suitable for this application is again the adhesive used in making repositionable notes which are commercially available under the trade designation "Post-it" from Minnesota Mining and Manufacturing Company ("3M") of St. Paul, Minn. This type of application is particularly suitable where an object 452 comprises a light object such as a sheet of paper which is to be separable from and potentially repositionable on the surface of object 450. When there is no longer a need to present the low-tack adhesive surface of layer 426, or if it otherwise desirable to remove the stretch release adhesive tape structure 412, stretching the tab 434 and thus the backing 422 will cause debonding of the adhesive layer 424 from the surface of object 450. Again, a separable connection is provided as well as a removable connection of the adhesive tape from an object. The tab 434 can remain hidden between the objects 450 and 452 because removal of the object 452 facilitates the ability to remove the stretch release adhesive tape structure 412 from the surface of object 450.

With respect to any of the foregoing embodiments specifically described and suggested, the separable connector layer or layers may also comprise a stretchable material (elastic or plastic). Then, upon stretch removal of the tape structure, the separable connector component of that tape structure may be stretched with the backing layer thereof. As to any embodiments utilizing a stretchable separable connector component that is provided as a separate layer, the stretchable separate component layer can be heat laminated or otherwise connected to the backing layer instead of using adhesive.

Also as to any of the foregoing embodiments specifically described and suggested, it is contemplated that the backing layer or layers (if utilized with adhesive layers as opposed to a solid adhesive backing layer) may be modified to optimize performance for a particular application. In general, foams are preferred to add resiliency and comformability, while films improve load bearing and rupture strength. For components of stretchable backing layers, the combined backing must be sufficiently extensible for debonding to occur but of sufficient tensile strength so as not to rupture during debonding. It is also contemplated that more layers, (films/foams, etc.) can be provided in any number of ways depending on the application.

Figure 11:
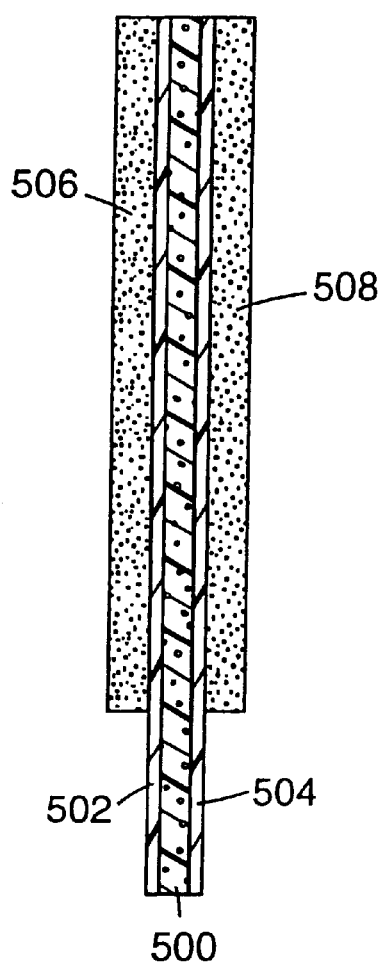
FIG. 11 is an enlarged side view in cross section of a stretch release adhesive tape structure usable in any of the embodiments in accordance with the present invention having a film/foam/film laminate construction.

FIG. 11 illustrates a preferred construction of a backing layer suitable for use in any of the above-described backing layers. A foam layer 500 is illustrated laminated with a first film layer 502 and a second film layer 504. The external major surfaces of the film layers 502 and 504 are coated with adhesive layers 506 and 508 of similar or different adhesive composition. The foam layer 500 and film layers 502 and 504 can be laminated together in any number of ways including co-extrusion, heat lamination, use of adhesives or other conventional methods. Preferably, a polyethylene/ethylene/vinyl acetate (EVA) copolymer foam layer is heat laminated with two layers of polyethylene film. Such a construction is preferred for its ability to conform to surfaces while maintaining sufficient rupture strength.

Suitable materials for any of the stretchable layers described in any of the embodiments above include any materials which are stretchable without rupture by at least 50 percent elongation at break and which have sufficient tensile strength so as not to rupture before debonding. Again, such stretchable materials may be either elastically deformable or plastically deformable provided sufficient stretching is possible to cause adhesive debonding of both adhesive surfaces for stretch removal.

Suitable plastic backing materials are disclosed in U.S. Pat. Nos. 5,516,581 and 5,672,402 to Kreckel et al and in co-pending U.S. patent application Ser. No. 08/308,937 (Bries et al.), each of which are commonly owned by the Assignee of the present application, and the complete disclosures of which are hereby incorporated by reference.

Representative examples of materials suitable for either a polymeric foam or solid polymeric film layer in the backing of the tape of this invention of the type utilizing a plastic backing include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

Polymeric foam layers for use in the plastic backing of the tapes of the invention generally will have a density of about 2 to about 30 pounds per cubic foot (about 32 to about 481 kg/m$^3$), particularly in tape constructions where the foam is to be stretched to effect debonding.

Preferred for plastic polymeric foam layers in the backing of the tapes of the invention are polyolefin foams. Polymeric foam layers are most preferably polyolefin foams available under the trade designations "Volextra" and "Volara" from Voltek, Division of Sekisui America Corporation, Lawrence, Mass.

Elastomeric materials suitable as backings for tapes in accordance with the present invention include styrene-butadiene copolymer, polychloroprene (neoprene), nitrile rubber, butyl rubber, polysulfide rubber, cis-i, 4-polyisoprene, ethylene-propylene terpolymers (EPDM rubber), silicone rubber, polyurethane rubber, polyisobutylene, natural rubber, acrylate rubber, thermoplastic rubbers such as styrene butadiene block copolymer and styrene-isoprene-styrene block copolymer and TPO rubber materials.

Solid polymeric film backings are preferably selected from polyethylene and polypropylene films, with the most preferred materials being unoriented linear low density and ultra low density polyethylene films. A preferred polyethylene film is that available under the trade designation "Maxilene 200" from Consolidated Thermoplastics Company, Schaumburg, Ill.

The backing may vary in overall thickness so long as it possesses sufficient integrity to be processable and provides the desired performance in respect to stretching properties for debonding the backing or tape from a surface. The specific overall thickness selected for a backing will depend upon the physical properties of the polymeric foam layer or layers and any solid polymeric film layer forming the backing. Where only one polymeric film or foam layer of a multi-layer backing is intended to be stretched to effect debonding, that layer should exhibit sufficient physical properties and be of a sufficient thickness to achieve that objective.

A plastic polymeric film layer such as is contained in the construction of FIG. 11, preferably will be about 0.4 to 10 mils (0.01 mm to 0.25 mm) in thickness, and will most preferably be about 0.4 to 6 mils (0.01 mm to 0.15 mm) in thickness.

The adhesive of the adhesive layers, excluding adhesives usable for the low-adhesion portion of a differential release tape, can comprise any pressure-sensitive adhesive, with the particular adhesion properties being dependent on the use of the tape, with the preferred adhesion properties generally ranging from about 4 N/dm to about 200 N/dm, preferably from about 25 N/dm to about 100 N/dm, at a peel angle of 180°, measured according to PSTC-1 and PSTC-3 and ASTM D 903-83 at a peel rate of 12.7 cm/min. Adhesives having higher peel adhesion levels usually require backings having higher tensile strength.

Pressure-sensitive adhesives suitable for being made into solid adhesive layers or for application to one side of a separate backing and/or the other in the tapes of the invention include tackified rubber adhesives, such as natural rubber; olefins; silicones, such as silicone polyureas; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques. Preferred are synthetic rubber adhesives or acrylics.

The thickness of each adhesive layer can range from about 0.6 mils to about 40 mils (about 0.015 mm to about 1.0 mm), preferably from about 1 mils to about 16 mils (about 0.025 mm to about 0.41 mm). In this preferred range of thicknesses, the thicker layers tend to cause the tapes to be more easily removable than do thinner layers. This is in contrast to conventional methods of removal, such as removal by peeling at peel angles of 90° or higher. In general, thicker layers of adhesive tend to cause the tapes to exhibit higher peel strength at a peel angle of 180° than do thinner layers. When the tapes of the present invention are released by stretching at a low angle, i.e., under 35°, the adhesive tends to be constrained by the backing and substrate for a single-coated adhesive tape and by the backing and two substrates for a double-coated adhesive tape, and is forced to undergo significant elongation. Under these conditions, the adhesive layer (or each adhesive layer) contracts, which reduces its cross-sectional area. Since the cross-sectional area, i.e., thickness times width, of a thinner layer of adhesive is already less than that of a thicker layer of adhesive, stress, i.e., force per unit area, is greater in the thinner layer of adhesive than in the thicker layer of adhesive. This leads, in effect, to a stiffening of the adhesive. Because stiffer layers offer more resistance to deformation, the force required for debonding is greater. The exposed adhesive layer or layers may be laminated to a conventional release liner prior to use.

Adhesives for adhering one polymeric foam layer to either another polymeric foam layer or a solid polymeric film layer include those pressure-sensitive adhesive compositions described above. Preferably the adhesive layer for adjoining one polymeric layer of the backing to another will be about 1 to 10 rails (about 0.025 to 0.25 mm) in thickness. Other methods of adhering the polymeric layers of the backing to one another include such conventional methods as co-extrusion or heat welding.

The tape of this invention can be produced by any conventional method for preparing pressure-sensitive adhesive tapes. For example, the adhesive can either be directly coated onto the backing, or it can be formed as a separate layer and then later laminated to the backing.

Removing the tape from the surface of a substrate can be carried out by simply stretching the tape in a direction up to an angle of about 35° from the surface. Preferably, the tape can be removed from the surface of a substrate by stretching the tape at an angle of no greater than about 10°. Removal at the appropriate angle will result in leaving no substantial or appreciable adhesive residue and in preventing the surface of the substrate from being damaged.

Debonding of a highly elongated adhesive tape of this invention at low angles is characterized by a "sharp" type of crack propagation. Like fracture of glassy materials, a sharp crack leads to high stress concentration at the crack front, where there is a low volume of adhesive material (in which stress may be dissipated). High stress concentration at the crack front leads to what is called brittle cleavage failure of the adhesive. Such failure typically occurs with low force (because of the low amount of energy dissipated in the adhesive material) and is cleanly interfacial.

In contrast, for higher peeling angles, i.e., angles generally greater than 35°, the backing tends not to stretch and the adhesive tends to undergo filamentation and rupture cohesively. Like fracture of glassy materials, propagation of a "blunt" crack is preceded by crazing. In this model, the observed filamentation of the adhesive at higher angles serves principally as an energy dissipation mechanism, analogous to craze fibrils found in glassy materials. The greater the energy dissipation, the greater the resistance to peeling and the higher the force required to peel the tape. A larger volume of material is involved in energy dissipation, and, as stated previously, stress is less concentrated. The adhesive filaments rupture cohesively to leave residue of adhesive on the surface or to cause damage to the surface.

The tape of this invention can be used in several areas, including the following categories:

(1) mounting applications on surfaces such as painted wallboard, plaster, concrete, glass, metal or plastic, such as wall hangings, dispensers, wire clips, body side molding on vehicles, carrying handles, signing application, e.g., road signs, vehicle markings, transportation markings, and reflective sheetings, etc.;

(2) joining or assembly applications;

(3) cushioning or sound deadening applications, such as cushioning materials for placement beneath objects or sound insulative sheet materials;

(4) closure applications, such as container closures, e.g., box closures, closures for food and beverage containers, and the like; diaper closures; surgical drape closures, and the like; and (5) removable labels, such as price tags or identification labels on containers.

The particular construction of the tape, e.g., the type of backing, the type of adhesive compositions, and relative position of backing and adhesive layers, are often required to be different for each category of use.

What is claimed is:

1. An adhesive tape for attaching plural objects to one another, said tape comprising a stretchable backing layer having first and second major surfaces and first and second ends, a non-adhesive manually engageable tab portion at one of said first and second ends to facilitate stretching of said backing layer, a first adhesive surface over at least a portion of said first major surface of said backing layer for bonding to a surface of an object, a second adhesive surface over at least a portion of the second major surface of said backing layer, the second adhesive surface over the second major surface of said backing layer is directly bonded to a separable connector layer, and a separable connector surface comprising hook or loop fasteners is provided as a surface of said separable connector layer, said separable connector surface covering at least a portion of said second major surface of said backing layer, wherein said backing layer and said first adhesive surface are stretchable together to effect progressive debonding of the first adhesive surface from an object, after the adhesive surface is bonded to that object, by the application of a force to the first end of the backing layer in a direction of extension of the backing layer between its first and second ends, and said separable connector surface possesses the ability to be connected, disconnected and reconnected to a cooperating connection surface without destruction of the separable connector surface and the adhesive tape.

2. A stretch releasing adhesive tape with a refastenable connection for attaching plural objects to one another, comprising:
   (a) a stretchable backing layer having first and second major surfaces and first and second ends, said first end including a non-adhesive manually engageable tab portion to facilitate stretching of said backing layer, said backing layer having a lengthwise elongation at break of from about 50% to about 1200%, said backing layer including a first adhesive layer over at least a portion of said first major surface for bonding to a surface of an object, a second adhesive layer over at least a portion of said second major surface of said backing layer, the second adhesive layer over the second major surface of said backing layer is directly bonded to a separable connector layer; and
   (b) a separable connector surface comprising hook or loop fasteners is provided as a surface of said separable connector layer, said separable connector surface distributed over at least a portion of said second major surface of said backing layer, said separable connector surface possessing the ability to be connected, disconnected, and reconnected to a cooperating connection surface without destruction of the separable connector surface and the adhesive tape;
wherein said backing layer and said first adhesive layer are stretchable together to effect progressive debonding of the first adhesive layer from an object, after the first adhesive layer is bonded to that object, by the application of a force to the manually engageable tab portion in a direction of extension.

3. An adhesive tape for attaching plural objects to one another, said tape comprising a stretchable backing layer having first and second major surfaces and first and second ends, a non-adhesive manually engageable tab portion at one of said first and second ends to facilitate stretching of said backing layer, a first adhesive surface over at least a portion of said first major surface of said backing layer for bonding to a surface of an object, a second adhesive surface over at least a portion of the second major surface of said backing layer, the second adhesive surface over the second major surface of said backing layer is directly bonded to a separable connector layer, and a separable connector surface comprising a strip of magnetic material is provided as a surface of said separable connector layer, said separable connector surface covering at least a portion of said second major surface of said backing layer, wherein said backing layer and said first adhesive surface are stretchable together to effect progressive debonding of the first adhesive surface from an object, after the first adhesive surface is bonded to that object, by the application of a force to the first end of the backing layer in a direction of extension of the backing layer between its first and second ends, and said separable connector surface possesses the ability to be connected, disconnected and reconnected to a cooperating connection surface without destruction of the separable connector surface and the adhesive tape.

4. An adhesive tape for attaching plural objects to one another, said tape comprising a stretchable backing layer having first and second major surfaces and first and second ends, a non-adhesive manually engageable tab portion at one of said first and second ends to facilitate stretching of said backing layer, a first adhesive surface over at least a portion of said first major surface of said backing layer for bonding to a surface of an object, a second adhesive surface over at least a portion of the second major surface of said backing layer, the second adhesive surface over the second major surface of said backing layer is directly bonded to a separable connector layer, and a separable connector surface comprising a layer of contact responsive material is provided as a surface of said separable connector layer, said separable connector surface covering at least a portion of said second major surface of said backing layer, wherein said backing layer and said first adhesive surface are stretchable together to effect progressive debonding of the first adhesive surface from an object, after the first adhesive surface is bonded to that object, by the application of a force to the first end of the backing layer in a direction of extension of the backing layer between its first and second ends and said separable connector surface possesses the ability to be connected, disconnected and reconnected to a cooperating connection surface without destruction of the separable connector surface and the adhesive tape.

* * * * *